May 15, 1928.  
V. ISACCO ET AL  
HELICOPTER  
Filed April 2, 1926    6 Sheets-Sheet 1

Inventors
V. Isacco
V. Andres
by
Attys.

May 15, 1928.  
V. ISACCO ET AL  
1,669,758  
HELICOPTER  
Filed April 2, 1926  
6 Sheets-Sheet 2

May 15, 1928.  1,669,758

V. ISACCO ET AL

HELICOPTER

Filed April 2, 1926    6 Sheets-Sheet 3

Inventors
V. Isacco
V. Andres
by Langner, Parry, Card & Langner
Attys.

Patented May 15, 1928.

1,669,758

UNITED STATES PATENT OFFICE.

VITTORIO ISACCO AND VICENTE ANDRES, OF PARIS, FRANCE; SAID ANDRES ASSIGNOR TO SAID ISACCO.

HELICOPTER.

Application filed April 2, 1926, Serial No. 99,368, and in France April 7, 1925.

This invention relates to a helicopter adapted for vertical flight, hovering at a fixed altitude, horizontal translation, ascent and descent in all directions and gliding.

Helicopters as heretofore constructed or proposed to be constructed are open to serious objections among which may be mentioned the following: they are unstable when at a fixed point due to the rotation of the sustaining screws in pairs in opposite directions, and this instability renders pilotage very difficult; the mechanical transmission of the power of the engine to the sustaining screws is difficult to effect by reason of the great speed reduction; the transmission and controlling elements are very complicated and the weight of the necessary transmission elements is prohibitive for an apparatus to be used for commercial purposes; further, the aero-dynamic efficiency in horizontal translation is very low, being a function of the forward inclination of the axis of rotation of the sustaining screws.

The helicopter which forms the subject of the invention overcomes these objections and presents a practical apparatus which comprises essentially a propelling system and a sustaining system absolutely independent of one another.

The propelling system is constituted by one or more tractor screws, with engine or engines, rotating on a substantially horizontal axis and mounted on a fuselage similar to that of an aeroplane, the fuselage being also equipped with vertical and horizontal rudders.

The sustaining system is constituted by blades or planes turning in the same direction and individually articulated to a common sleeve or socket adapted to turn freely around a normally vertical cylindrical column fixed to the upper part of the fuselage. This arrangement gives the possibility of horizontal flight without liability to upset the apparatus and also ensures automatic stabilization in all directions and in all conditions of flight, while pilotage is rendered very easy. Engines are mounted on certain pairs of the blades and each actuate two screws which turn in opposite directions and the common axis of which intersects at right angles the axis of the corresponding blade. It is thus possible to dispense with a mechanical transmission between an engine carried by the hull of the apparatus and the sustaining screws, in consequence of which there are obviated the drawbacks resulting from the employment of such a transmission. As the screws on each engine-carrying blade turn in opposite directions, they produce no reaction on the blade because their effects cancel one another.

An adjustable device is provided for maintaining automatically a certain relation between the inclination of the blades to the horizontal and their angle of incidence.

Finally, means for simultaneous adjustment of the mean incidence of all the blades, for the control of the several engines of the apparatus and for the operation of the rudders complete the helicopter.

In the accompanying drawings

The helicopter illustrated is constituted by a fuselage 1 with a landing carriage 2 and with a sprag 3 of such length that the apparatus may be substantially upright when at rest; an engine 4 having a substantially horizontal shaft and a screw 5 comprising four blades complete the propelling system.

Figure 1:
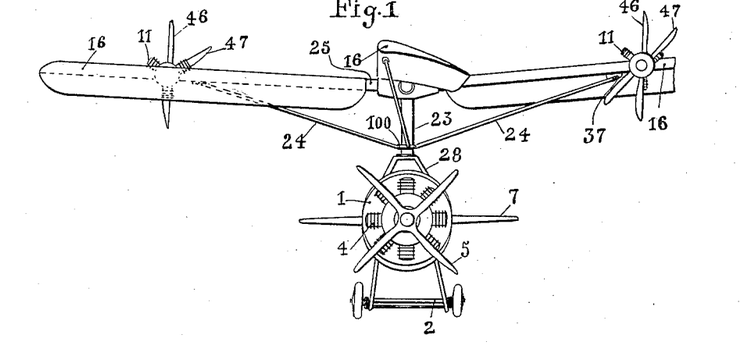
Fig. 1 is a front view of the apparatus of the invention assumed to be in full flight.
Figure 2:
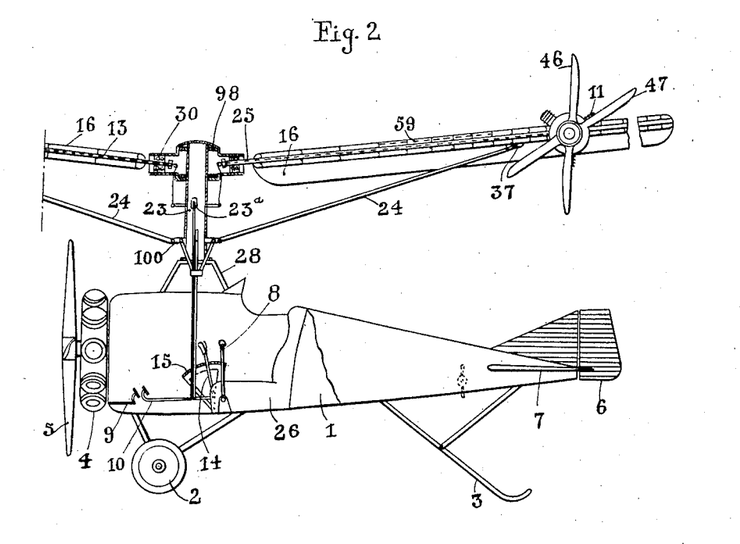
Fig. 2 is a profile view with certain parts in section.
Figure 3:
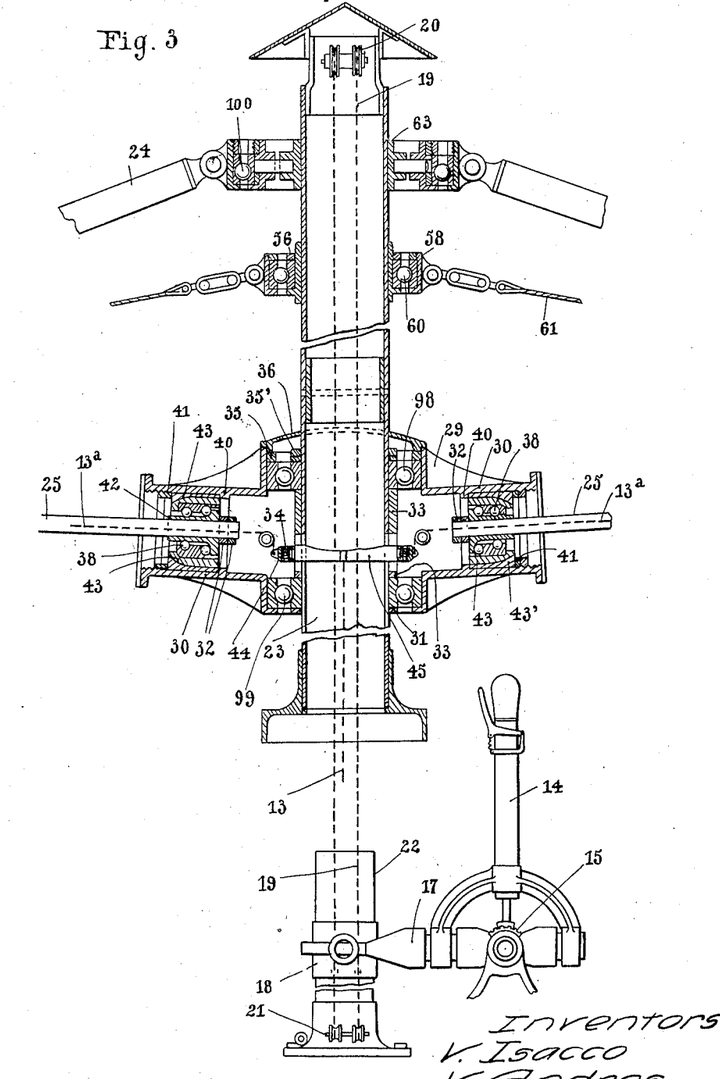
Fig. 3 is a view in section to a larger scale on the vertical plane III—III of Fig. 6.
Figure 4:
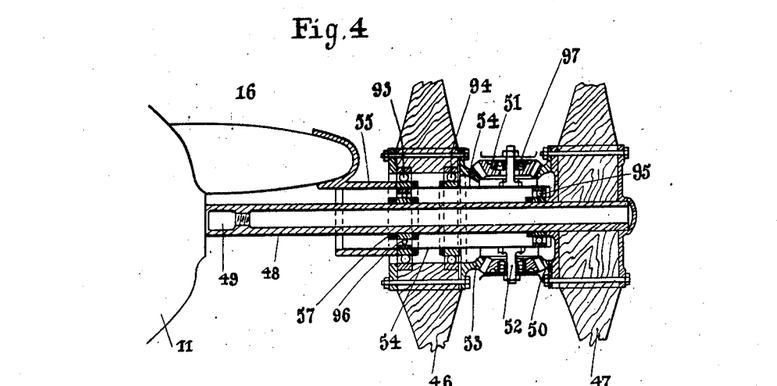
Fig. 4 is a detail view in section to a larger scale on the line IV—IV of Fig. 7 showing the hubs of the screws mounted on a sustaining blade.
Figure 6:
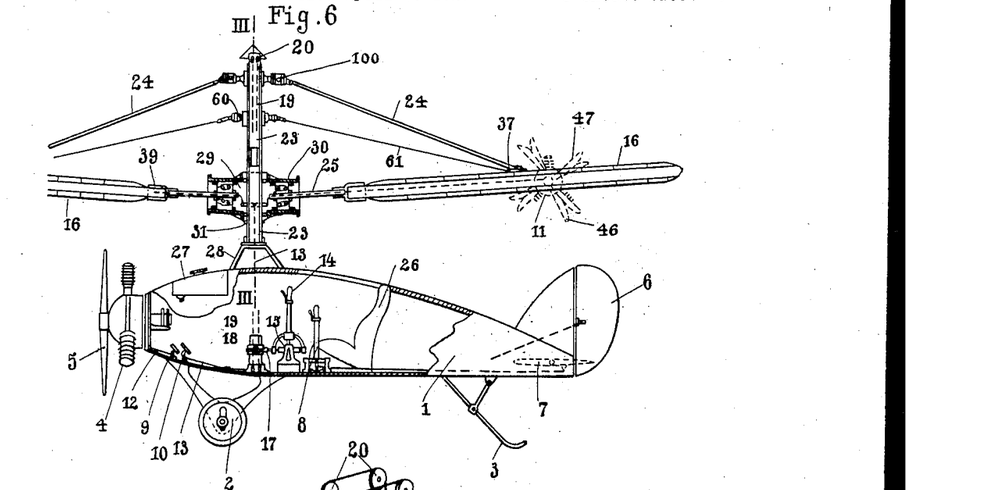
Fig. 6 is a corresponding profile view, partly cross-hatched.

In the fuselage 1 are located the several devices under the control of the pilot and notably the hand-lever 8, Figs. 2 and 6, which operates the steering rudder 6 and the horizontal rudder 7, the pedals 9 and 10 which control, through the intermediary of the cables 12 and 13, respectively, the admission of fuel to the propelling engine 4 and to engines 11 mounted on the sustaining blades 16, and the hand lever 14, Fig. 3, which controls the incidence of the set of blades 16 of the sustaining screw and which may be locked by the pilot in the desired position by engagement with the toothed sector 15.

Figure 8:
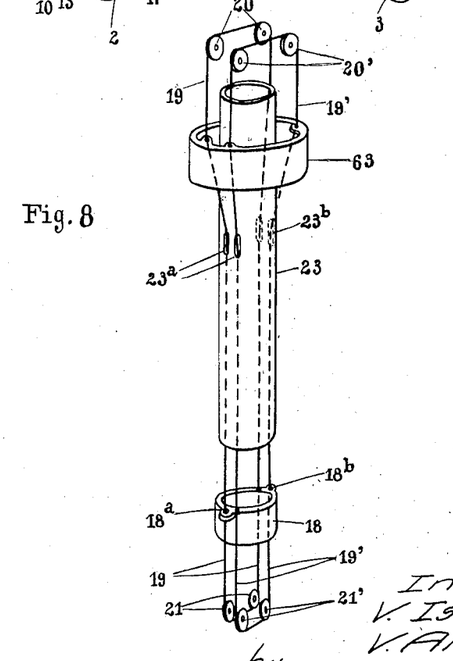
Fig. 8 is a perspective view showing a detail.

The lever 14 entrains in its movement the fork 17 which embraces the sleeve 18. To the sleeve which slides longitudinally of the cylinder 22 are connected at two diametrically opposed points two wire cables 19 and 19¹, Fig. 8, which rise within the cylindrical column 23, pass over upper pulleys 20 and then around lower pulleys 21 and are joined together at their points of attachment to the sleeve 18, that is at 18ª and 18ᵇ. These cables emerge from the column 23 through the slots 23ª, 23ᵇ and are individually fixed to the ring 63 in such wise that the movement of the sleeve 18 effects movement in the same direction of the ring 63.

The ball bearing 100, Fig. 3, including a race fixed to the ring 63 also slides longitudinally of the upper part of the cylindrical column 23. The position of the ball bearing 100 determines the angle of incidence of the sustaining blades 16 due to the interposition of ties 24 articulated to the outer race of the bearing 100 and at their outer ends to slides 37 movable in ways located at the leading edges of the blades 16. To prevent these ties 24 from being subject to compression on the downward displacement of the ball bearing 100, when the incidence of the blades is diminished, the centre of thrust of each of the latter is located in rear of the axis of the tube 25 on which the relative blade is mounted.

Due to the mounting represented notably in Fig. 3 for the ball bearing 100 the lever 14, sleeve 18 and the bearing 100 can be slightly inclined to effect a determined inclination of the axis of the apparatus. The pilot's seat 26 and the fuel reservoir 27 for the propelling engine 4 complete the equipment of the fuselage.

Figure 5:
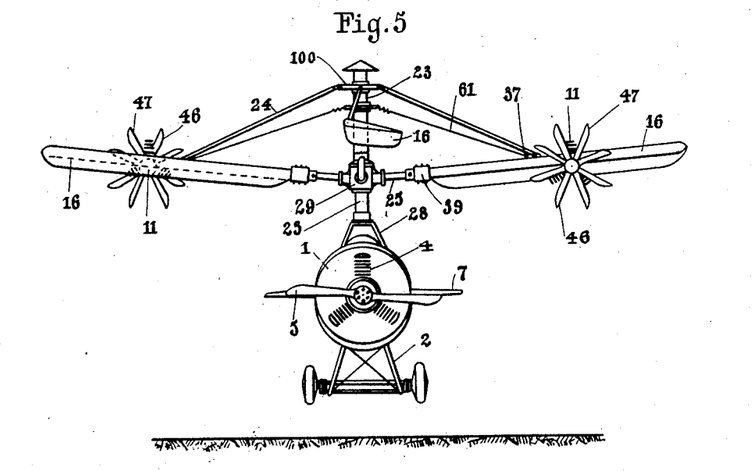
Fig. 5 is a front view analogous to Fig. 1 showing a variant.

The cylindrical column 23 is sustained above the fuselage by the tubular struts 28, Figs. 5 and 6. At a fixed point of this column is mounted the hub member 29 provided with as many branches 30 as there are sustaining blades. The mount includes the thrust member 31, ball bearings 99, 98, distance pieces 33, nuts, 35, 35¹ and cap 36. The member 29 can turn freely with slight friction around the cylindrical column 23.

In each of the branches 30, Fig. 3, inclined to the horizontal as indicated, is sleeved a tube 25 forming the end of a blade and connected to it by a member 39 of suitable form; this tube 25 penetrates the bearing 38 located in the branch 30 between the ledge 40 and nut 41. A sleeve 42 and associated nuts 32 fix the ball bearing 38 in relation to the tube 25, the outer race of the bearing having a spherical surface 43 mating with a counterpart seat member 43¹.

The control of the supply of fuel to the engines 11 on the blades is effected by operation of the wire 13 controlled by the pedal 10, whereby to effect the sliding movement along the sleeve 33 of the bearing 34 to the inner race 45 of which the wire is attached, the relative outer race being connected to the cables 13ª led through the interior of the tubes 25 to the engines 11; to permit of this movement, the race 45 comprises arms traversing slots formed in the sleeve 33 and in the cylindrical column 23.

Figure 7:
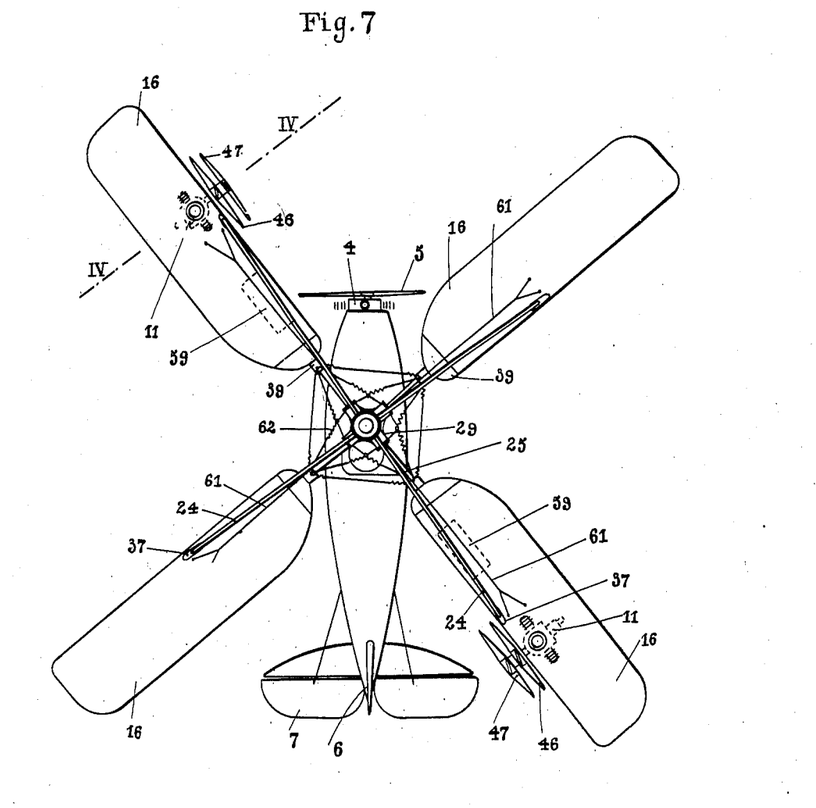
Fig. 7 is a plan view of the helicopter.

The fuel for the engines 11 is contained in reservoirs 59, Fig. 7, fitted to the blades 16. The engines are fed by centrifugal action, dispensing with the necessity for employment of a pump.

The blades 16 which form the sustaining screw are constituted like the wings of an aeroplane. On two opposed blades or on all four are fixed engines 11 each of which effects rotation of two propellers 46, 47 of opposite hand turning in opposite directions. The engine operates directly by way of the prolongation 48 of the shaft 49 the exterior screw 47 the hub of which carries a bevel gear 50 and drives the interior screw 46 in the direction opposite to its own movement. The drive of the screw 46 is effected by means of pinions 51 which turn idly on ball bearings 97 on pins 52 and mesh with a bevel gear 53 fixed on the hub of the interior screw 46. The pins 52 are carried by the drum 54 sleeved in a part 55 fixed to the leading edge of the blade 16. Bearings 96 and 95 secured by the washers 57 permit the rotation of the shaft extension 48. The interior screw 46 turns on the sleeve 54, ball bearings 93 and 94 being interposed.

Near the upper end of the cylindrical column 23 is fixed the interior race 56 of a bearing 60 to the exterior race 58 of which are fixed elastically wires 61 which stay the blades 16 when the latter are at rest. These blades are connected independently with each other by the cables 62 so as to limit their distance apart.

Figures 9, 10, 11, 12:
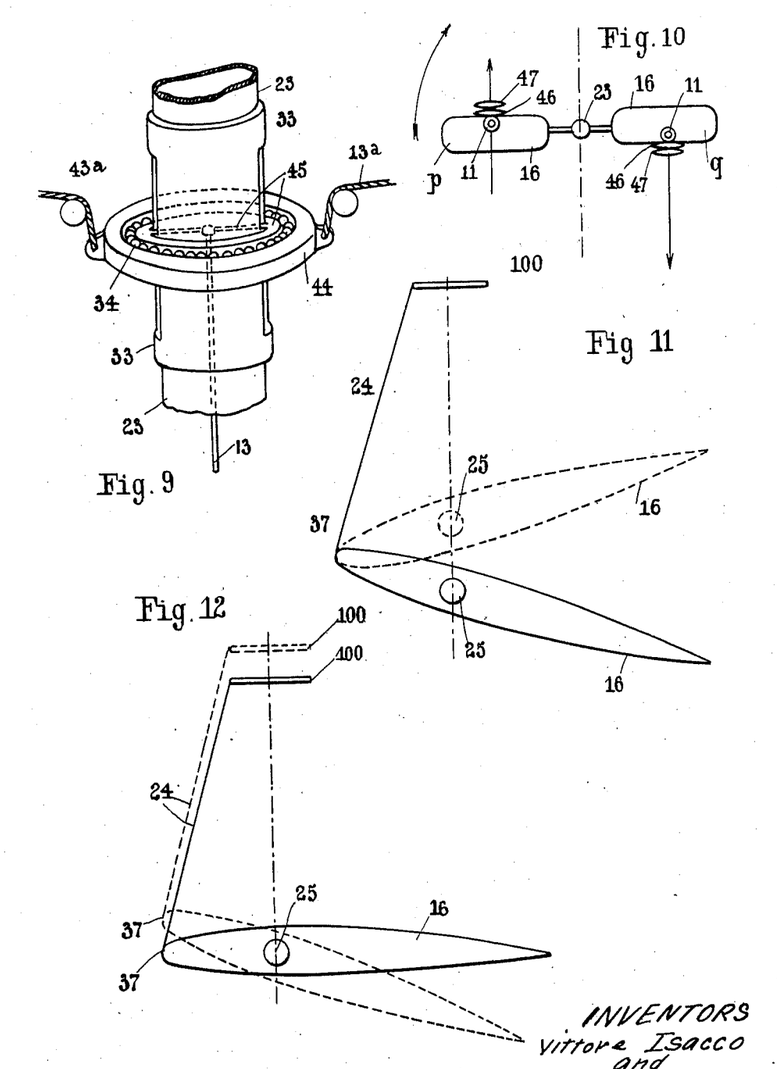
Fig. 9 is a detail of Fig. 3 in perspective.
Fig. 10 is a diagrammatic view relative to horizontal translation.
Figs. 11 and 12 are diagrammatic views showing the wings in different positions.

From the foregoing it will be seen that the sustaining of the helicopter is effected by the rotation in the proper direction of the blades 16 around the cylindrical column 23, this rotation being effected by the operation of the screws 46 and 47 driven by the engines 11. Due to the individual articulation of the blades 16 the apparatus is automatically stabilized in all directions and in all conditions of flight, and reassumes its normal position when the disturbing influences cease to be operative, and that without the intervention of the pilot. In fact, during horizontal translation without wind, there exists a difference in thrust between the blades on opposite sides of the apparatus. Referring to Fig. 10 if we assume the direction of rotation of the sustaining propeller to be opposite to the direction of advancement of the machine as shown by the arrows, if the speed of the propeller and that of the machine be substantially equal, then the average thrust of the blade $p$ is zero. As regards the opposite blade $q$ these two speeds are added together and since the thrust is a function of the square of the total speed it becomes considerable with respect to the opposite side. If the blades were rigidly mounted instead of articulated to the fuselage there would be a considerable tipping effect which no controlling mechanism would be able to overcome, as it is well known in the art that flight with a single rigid lifting propeller is impossible.

By means of the articulation of the blades they are permitted to be raised up under the action of the thrust. This produces equilibrium of the forces present anew and the blades take a new position with a new angle of attack. There results only a very slight tipping effect which is counteracted by the slight inclination of the apparatus and assures automatic stabilizing. The above described operations take place in an analogous manner should the apparatus be subjected to a gust of wind of any consequence, that is, the wings rise to a new position of equilibrium and transmit only a very slight tipping effect to the machine.

All this is automatic and the pilot need only intervene for changing the nature of the flight (rise, descent etc.). Further, due to their weight, their diameter and their angular speed, the blades of the sustaining screw constitute an efficacious gyroscopic system which resists any rapid variation of their plane of rotation without being subject to the serious drawbacks of the like gyroscopic system with blades fixedly interconnected and rigidly fixed to a common hub; it is with the object of reducing their gyroscopic effect that the screws 46 and 47 are formed with four blades.

The system of a pair of screws 46, 47 turning in opposite directions does not involve any important reaction on the supports 55 for the blades 16 in the rotation of the blades around the cylindrical column 23; in fact, these two screws of the same weight rotating at the same speed in opposite directions produce reactions in opposite directions which are cancelled on the support 55.

By effecting the simultaneous and total shift of the blades the angle of incidence may be adjusted by the pilot to give the best efficiency in all conditions of flight; the slides 37 are necessary to permit this variation of the incidence because of the constant length of the tubular tension members 24. As the controlling means may be locked in position by aid of the toothed sector 15, the pilot will only have to operate the controlling hand lever when varying the style of flight, so that when hovering at a fixed point he will be able to deal with the effort of the wind by operating the front engine 4 under any desired conditions.

To compensate for the frictional effort of the ball bearings tending to drag the apparatus round in the direction of rotation of the blades, the steering rudder is inclined in the desired direction in relation to a vertical plane, this inclination being controlled by operation of the hand-lever 8. The draft caused by the blades 16 is thus utilized and suffices completely to compensate for this couple; there might also be employed a screw on a horizontal axis located near the rudder.

The small propeller with the horizontal shaft constitutes a means used for opposing the rotation of the fuselage in the same direction as that of the sustaining propeller. This movement of rotation can result from the swaying of the fuselage by the wind of the blades, due to the friction in the ball-bearings.

The variation in incidence of the blades is automatically linked to their inclination above the horizontal in consequence of the constant length of rods 24, connected at one end to the bearing 100 and at the other to the leading edge of each blade. The slides 37 permit only a slight movement of the blades in such a manner that their inclination above the horizontal can vary slightly without affecting their angle of attack. The two variations in angle of attack, automatically or under the pilot's command, becomes superposed therefore but without ceasing to remain independent of each other.

In Fig. 11 the wing is in the act of raising up while the bearing 100 remains stationary, the angle of attack diminishing.

In Fig. 12 the bearing 100 is raised by the pilot, the longitudinal inclination of the wings remaining constant and the angle of attack increasing.

During these operations, the extremity of 24 reciprocates in the slide 37 following the direction of the forces. The displacement of the extremity of these rods is retarded by springs.

The ascent and descent of the apparatus in a vertical path are effected by varying in a suitable direction the total incidence of the blades 16 or by varying the power of the engines 11.

Horizontal translation of the apparatus is effected by means of the propelling engine actuating the screw 5; as the sustaining of the helicopter can always be ensured by the engines 11, the engine for propulsion will only have to overcome the drag of the blades and the resistance set up by the apparatus.

As the efficiency of the sustaining screw increases with the speed of translation the power to be supplied by the engines 11 will be less than when the apparatus remains at a fixed point, whence there results a marked security during the operation of the engines. A part of the excess power may be used by inclining slightly forwards the horizontal rudder of the apparatus. In operation under these conditions the horizontal and vertical rudders may be manipulated as in an ordinary aeroplane.

The ascent and descent of the apparatus are obtained by the combination of the thrust of the blades 16 of the sustaining screw and the traction of the screw 5. In the main the pilot will only have to operate the two pedals 9 and 10 controlling the fuel admission.

Vol-planing or gliding descent of the apparatus in case of break-down of all the engines may be effected by controlling the variation of the incidence by aid of the central hand-lever 14; the incidence of the blades will then be diminished to the necessary positive or negative value to obtain the speed of descent desired by the pilot. In consequence of such descent the blades 16 will automatically rotate in the same direction as before the stoppage of the engines 11. Vol-planing may also be effected in a vertical path at the will of the pilot.

The apparatus described above presents certain additional interesting features.

(a) The arrangement of the freely articulated blades not only ensures automatic stabilization in all directions as well as the possibility of horizontal flight with a single sustaining screw but also permits the construction of the blades of considerably less weight than the wings of an aeroplane. In fact, as the thrust is balanced by the normal component (normal to the plane of the blade) of the centrifugal force and the drag set up by the component contained in such plane and perpendicular to the axis of the blades, the only remaining effort exercised on the latter is the radial component of the centrifugal force which sets up only tension stresses; the moments of local flexion along the length of the blades are negligible. The blades take up during flight an inclination above the horizontal, in rear or in front of their position at rest, corresponding to the efforts of thrust and drag to which they may be subjected.

(b) The arrangement of the tubular connections 24 and of the slides 37 permits, during translation, automatic variation of the differential incidence of the blades. In fact, during translation the same blade is subjected during one rotation to variable efforts of thrust and tension changing from a maximum to a minimum. When the thrust is a maximum the inclination of the blade above the horizontal will tend to diminish, the tube 24 acting on its leading edge only permitting it to assume a greater inclination on diminution of its angle of incidence. When the thrust is a minimum, the opposite phenomenon is met with. By virtue of this arrangement the inclination of the blades above or below their position adjusted by the pilot is limited. Further, this automatic variation of the incidence of the blades materially increases the efficiency of the sustaining system.

(c) The complete independence of the sustaining system and propelling system gives considerable advantage as concerns security.

Suppose, for example, that the front propelling engine stops during translation. By means of the horizontal rudder the pilot can incline the axis of the apparatus in the direction of advance in such ways that the thrust of the sustaining propeller (the rotation of which continues) may be inclined, and accordingly gives a horizontal component of traction which assures translation.

Likewise if the engines located on the wings come to a stop, the flight can continue. It is only necessary for the pilot to incline the axis of the apparatus toward the rear by actuating the horizontal rudder. The speed of advancement assures therefore the rotation of the blades and consequently sustenation.

Flying apparatus might be constructed with a simple sustaining propeller turned by the action of the speed of advancement.

(d) The stoppage of the engines on the blades does not prevent translation at low speed. By inclining the axis of the apparatus to the rear of the vertical and giving the blades a suitable incidence the pilot can cause the sustaining screw to rotate automatically, the draft resulting from the translation furnishing the necessary energy for ensuring rotation of the blades in the same direction and giving the necessary thrust. Only in case of stoppage of all the engines, and that would be difficult to foresee, the pilot will be obliged to land vertically or glide obliquely at will.

It will thus be seen that apparatus according to the invention satisfies all the conditions required of a helicopter for industrial purposes and that it presents also advantages of security, of automatic stabilization, economy of weight and ease of pilotage superior to what is obtainable with existing aeroplanes. As regards simplicity it is comparable with an aeroplane, which from the industrial point of view is of primary interest.

It is to be understood that the invention is not limited to the details of construction described or shown and that modification may be incorporated without departure from the principle of the invention.

Thus, the screws 46 and 47 and the differential gear connecting them may be dispensed with in case of employment of direct re-action engines; the blades may be biplane of multi-plane with or without a connection between the planes and may be of greater or less number than four. Further, the tubes 24 may be replaced by cables with the necessary modification of details. Finally, in lieu of one engine for each blade there may be provided two, one near the leading edge and the other near the trailing edge, each engine actuating one screw, and the differential gear being dispensed with.

What is claimed is:—

1. In a helicopter the combination of a fuselage, a propelling system comprising a motor attached to said fuselage and turning a driving propeller, a sustaining system consisting of a series of blades articulated in all directions individually on a common sleeve, turning freely about a vertical axis, motors fixed on said blades, each of said motors turning two propellers in the reverse direction and means for controlling the angle of attack of the blades consisting of a ball-bearing comprising two races, the outer race being rotatable and connected to the leading edge of the blades by means of rigid tubes and the interior race sliding along said vertical axis at the will of the pilot by means of a special lever.

2. In a helicopter the combination of a fuselage having vertical and horizontal rudders, a propelling system comprising a motor attached to said fuselage and turning a driving propeller, a sustaining system consisting of a series of blades articulated in all directions individually on a common sleeve turning freely about a vertical axis, motors fixed on said blades, each of said motors turning two propellers in the reverse direction and means for controlling the supply of gas to said motors situated on said blades consisting of a ball-bearing comprising two races, the outer race being rotatable and connected to the carburetor levers and the interior race sliding along said vertical axis at the will of the pilot by means of an accelerating pedal.

3. In a helicopter the combination of a fuselage having vertical and horizontal rudders, a propelling system comprising a motor attached to said fuselage and turning a driving propeller, a sustaining system consisting of a series of blades articulated in all directions individually on a common sleeve turning freely about a vertical axis, elastically connected together for limiting their amount of spreading and capable of oscillating about the axis of the tube which supports them, the center of thrust of each blade being to the rear of the axis of said tube, motors fixed on said blades in such a manner that there is equilibrium of the centrifugal forces in play, each of said motors turning two propellers in the reverse direction by means of a reversing gearing, means for controlling the angle of attack of the blades consisting of a ball-bearing comprising two races, the outer race being rotatable and connected to the leading edge of the blades by means of rigid tubes fitting in a short slide on the leading edges of the blades and the interior race sliding along said vertical axis at the will of the pilot by means of a special lever, and means for controlling the supply of gas to said motors situated on said blades consisting of a ball-bearing comprising two races, the outer race being rotatable and connected to the carburetor levers and the interior race sliding along said vertical axis at the will of the pilot by means of an accelerating pedal and tanks for gasoline or oil lodged in the interior of said blades.

4. In a helicopter the combination of a sustaining system comprising blades individually articulated in all directions, and a common sleeve for said blades, said sleeve being rotatable around a substantially vertical axis.

5. In a helicopter the combination of a sustaining system comprising blades individually articulated in all directions, a common sleeve for said blades, said sleeve being rotatable around a substantially vertical axis, and means for elastically interconnecting said blades so as to limit their displacement in a horizontal plane.

In testimony whereof we have signed our names.

VITTORIO ISACCO.
VICENTE ANDRES.